Figure 1:
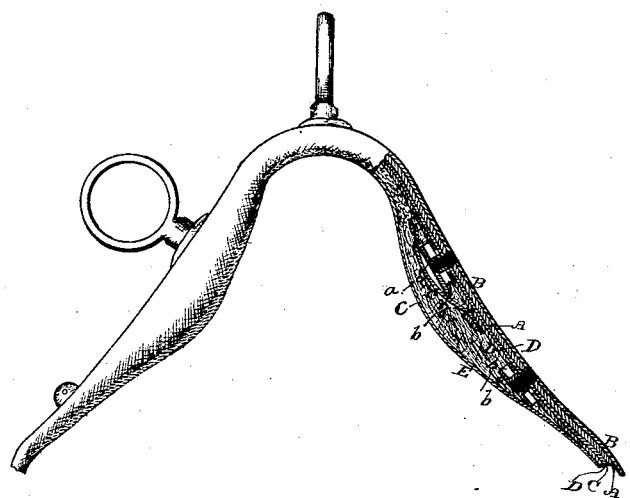
Figure 2:
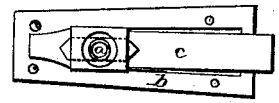
Figure 3:
Figure 4:
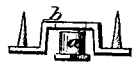

J. HUBER.
Harness-Pads.

No. 149,400. Patented April 7, 1874.

WITNESSES.
F. A. Lehmann
W. W. J. Murphy

INVENTOR.
J. Huber
per
O. Drake, Atty.

UNITED STATES PATENT OFFICE.

JACOB HUBER, OF NEWARK, NEW JERSEY.

IMPROVEMENT IN HARNESS-PADS.

Specification forming part of Letters Patent No. 149,400, dated April 7, 1874; application filed February 4, 1874.

*To all whom it may concern:*

Be it known that I, JACOB HUBER, of the city of Newark, in the county of Essex and State of New Jersey, have invented certain new and useful Improvements in Harness-Pads; and I do hereby declare the following to be a full, clear, and exact description of the invention, such as will enable others skilled in the art to which it pertains to make and use it, reference being had to the accompanying drawings, which form part of this specification.

This invention relates to that class of pads in which the pad-plate is separate and distinct from the bottom or stuffed part of the pad, said plate being confined between the outside leather covering and the lining, and having holes through it for the hook, terrets, and screws. The bottom of the pad is made and stuffed without any pad-plate in it, and is provided with suitable metallic frames, in which the nuts or sockets are confined which receive said terrets and screws.

The accompanying drawing illustrates my invention.

The nature and object of this invention are to provide a way by which, in a harness-pad, mountings of a given size and finish may be removed at pleasure and others substituted therefor without ripping the pad apart or soiling it.

The iron pad-plate A is confined between the outside leather covering B and the lining C, and is provided with holes for the hooks, terrets, and screws. The bottom of the pad is stuffed and finished independent of the pad-plate, the stuffing being placed between the socket-piece D and the bottom lining E, the edges of which are bound in the ordinary manner, and form a socket for the reception of the pad-plate, which is secured thereto by the terrets and screws. The nuts $a$, in which the terrets and screws are secured, are adjustable, and held in position by metallic frames $b$, which are placed between the socket-piece D and bottom lining E, and secured therein by suitable screws or rivets, or pins cast upon the plates and projecting upward through the socket-piece and clinched. Said plates $b$ are molded on the bottom to conform to the shape of the pad, and have an upward projection which is even with the surface of the socket-piece D, and has a hole large enough to admit the nuts $a$. These projections are hollow and confine said nuts, and are so formed in relation to and in connection with the frames $b$ as that said nuts may be adjusted and removed at pleasure without ripping or soiling the pad. In order to prevent the nuts from coming into contact with the stuffing, a thin metallic plate or strip of leather, $c$, is inserted beneath the nut, resting upon the frame $b$.

What I claim as new, and desire to secure by Letters Patent, is—

In a harness-pad, the frames $b$, secured in the bottom part of the pad, in combination with the adjustable nuts $a$, substantially as and for the purposes shown and described.

In testimony that I claim the foregoing I have hereunto set my hand this 31st day of January, 1874.

JACOB HUBER.

Witnesses:
GEO. H. WILSON,
DAVID COLLINS.